(12) United States Patent
Langsdorf et al.

(10) Patent No.: US 8,490,272 B1
(45) Date of Patent: Jul. 23, 2013

(54) MERGE/DIVERGE CONVEYING APPARATUS AND METHOD OF PROVIDING A CONVEYOR BELT FOR A MERGE/DIVERGE APPARATUS

(75) Inventors: John Langsdorf, Bedford, TX (US); Gary Cline, Southlake, TX (US)

(73) Assignee: Transnorm System, Inc., Arlington, TX (US)

( * ) Notice: Subject to any disclaimer, the term of this patent is extended or adjusted under 35 U.S.C. 154(b) by 252 days.

(21) Appl. No.: 13/065,383

(22) Filed: Mar. 21, 2011

(51) Int. Cl.
*B23P 11/02* (2006.01)

(52) U.S. Cl.
USPC ............................ 29/448; 198/839; 198/844.2

(58) Field of Classification Search
USPC ................. 29/446, 448; 198/844.2, 839, 831, 198/804, 844.1, 845, 846, 848, 851, 860.1, 198/860.5
See application file for complete search history.

(56) References Cited

U.S. PATENT DOCUMENTS

| | | | |
|---|---|---|---|
| 3,100,565 A | 8/1963 | Fry | |
| 4,900,609 A * | 2/1990 | Arnold | 428/163 |
| 5,377,818 A | 1/1995 | White | |
| 5,732,749 A * | 3/1998 | Fargeout | 139/383 AA |
| 5,775,829 A * | 7/1998 | Valles Pousa | 403/119 |
| 6,164,439 A | 12/2000 | Stebnicki et al. | |
| 6,484,871 B2 | 11/2002 | Van Leeuwen | |
| 2002/0005337 A1 | 1/2002 | Van Leeuwen | |
| 2002/0170806 A1 | 11/2002 | Engle et al. | |
| 2003/0034233 A1* | 2/2003 | Lunghi | 198/835 |
| 2003/0150698 A1* | 8/2003 | Herold | 198/844.2 |
| 2007/0131524 A1* | 6/2007 | Buxton | 198/839 |

* cited by examiner

*Primary Examiner* — David Bryant
*Assistant Examiner* — Ryan J Walters
(74) *Attorney, Agent, or Firm* — Kenneth F. Pearce

(57) ABSTRACT

A conveyor belt for use with a merge or diverge conveying apparatus and a method of providing a new conveyor belt to the conveying apparatus. Polymeric loops attached to each end of the conveyor belt attach the ends of the conveyor belt to each other. Visible wear and tear to the nose bar of the merge or diverge conveying apparatus is reduced when compared to prior art conveyor belts for merge or diverge conveyors.

10 Claims, 9 Drawing Sheets

FIG 7

| Supplying an elongate member comprising: i) either nonwoven felt or a urethane core; ii) parallel opposing longitudinal sides; iii) a first abutment end; and iv) a second abutment end; iv) a first band attaching one or more clusters of polymeric loops to the first abutment end of the elongate member; and v) a second band attaching one or more clusters of polymeric loops to the second abutment end of the elongate member |
|---|

| Supplying a nylon 6-6 flexible pin for interlocking one or more clusters of polymeric loops |
|---|

| Positioning the elongate member and the nylon 6-6 flexible pin in proximity with the merge conveyor or the diverge conveyor |
|---|

| If an old conveyor belt is to be removed from the merge conveyor or said diverge conveyor, easing any existing tension applied to the old conveyor belt such that the old conveyor belt is removed from the merge conveyor or the diverge conveyor |
|---|

| Fitting the elongate member about the merge or diverge conveyor and meshing the one or more clusters of polymeric loops attached to the first abutment end of said elongate member and the second abutment end of the elongate member |
|---|

| Using the nylon 6-6 flexible pin to secure the meshed clusters of polymeric loops |
|---|

| Applying adequate tension to the new conveyor belt so that the new conveyor belt is capable of being pulled about the conveyor bed |
|---|

FIG 8

Supplying an elongate member comprising: i) either nonwoven felt or a urethane core; ii) parallel opposing longitudinal sides; iii) a first abutment end; and iv) a second abutment end; iv) a first band attaching one or more clusters of polymeric loops to the first abutment end of the elongate member; and v) a second band attaching one or more clusters of polymeric loops to the second abutment end of the elongate member

Supplying a nylon 6-6 flexible pin, including a bent curve at one end thereof, for interlocking one or more clusters of polymeric loops

Positioning the elongate member and the nylon 6-6 flexible pin in proximity with the merge conveyor or the diverge conveyor

If an old conveyor belt is to be removed from the merge conveyor or said diverge conveyor, easing any existing tension applied to the old conveyor belt such that the old conveyor belt is removed from the merge conveyor or the diverge conveyor

Fitting the elongate member about the merge or diverge conveyor and meshing the one or more clusters of polymeric loops attached to the first abutment end of said elongate member and the second abutment end of the elongate member

Using the nylon 6-6 flexible pin to secure the meshed clusters of polymeric loops

Applying adequate tension to the new conveyor belt so that the new conveyor belt is capable of being pulled about the conveyor bed

MERGE/DIVERGE CONVEYING APPARATUS AND METHOD OF PROVIDING A CONVEYOR BELT FOR A MERGE/DIVERGE APPARATUS

BACKGROUND OF THE INVENTION

1. Field of the Invention

Among other things, the present invention includes a method of providing a new conveyor belt for a merge or diverge conveyor as well as a conveyor belt for use with a merge or diverge conveyor. The conveyor belt is provided with one or more clusters of polymeric loops that are interlocked with each other after the belt has been threaded about the merge or diverge conveyor. For ease of securing the conveyor belt to the merge or diverge conveyor, the polymeric loops can be joined together in a zipper-like manner. The combination of the polymeric loops and the polymeric flexible pin reduce visible wear and tear to the nose bar of the merge or diverge conveying apparatus when compared to the prior art conveyor belts for merge or diverge conveyors.

2. Description of the Previous Art

Any discussion of references cited in this Description of the Previous Art merely summarizes the disclosures of the cited references and Applicants make no admission that any cited reference or portion thereof is relevant prior art. Applicants reserve the right to challenge the accuracy, relevancy and veracity of the cited references.

1) U.S. Pat. No. 3,100,565-Fry enables an endless belt for a conveyor belt-turn. In part, Column 2 of Fry reads, "FIG. 12 is a fragmentary perspective view of a portion of the belt ends and illustrating a preferred manner of interconnecting the ends together."

Among other things, U.S. Pat. No. 3,100,565-Fry does not appear to disclose intermeshed polyester loops attached to the abutment ends of the conveyor belt that are secured by a polymeric pin. Further, Fry does not disclose a merge/diverge conveyor incorporating a slanted nose bar.

2) U.S. Pat. No. 6,484,871-Van Leeuwen enables a segmented belt turn conveyor. In part, Columns 8 and 9 of Van Leeuwen read, "Referring to FIG. 14, another embodiment 412 of the belt of the present invention is illustrated. Similar to the first three embodiments, belt 412 includes a plurality of belt segments 438, which are interconnected by vulcanized finger splices 440 a and lacing clips 440 b. Each segment 438 comprises a segment having an angle A in a range from approximately 5° to 75°, in a range from approximately 5° to 35°, or approximately 25°.

Lacing clips 440 b are optionally aligned along the radii of belt 412 and are placed on belt 412 by a lacing machine. In order to ease alignment of belt 412 in the lacing machine, a lacing jig 442 is provided (see FIG. 15), which is described in greater detail below. Other methods of aligning the lacing clips may be used, however. For example, belt 412 may be marked, for example, on the back side of belt 412.

In order to place lacing clips 440 b on belt 412, lacing jig 442 is initially placed into the comb at one end of the lacing machine. A required number of wire clip fasteners are placed into the comb of a lacing machine next to the jig. The edge of the belt is put into position resting on the comb. The belt is then pushed toward the lacing jig for proper alignment, with the lacing machine actuated, such as by pushing a foot pedal, to crimp the lacing hooks into the belt. The resulting lacing is radially aligned along the belt."

Among other things, U.S. Pat. No. 6,484,871-Van Leeuwen does not appear to disclose intermeshed polyester loops attached to the abutment ends of the conveyor belt that are secured by a polymeric pin. Further, Van Leeuwen does not disclose a merge/diverge conveyor incorporating a slanted nose bar.

3) US Published Patent Application 20020005337-Van Leeuwen discloses a segmented belt turn conveyor. The specification of the '337 Application is identical to U.S. Pat. No. 6,484,871-Van Leeuwen.

4) US Published Patent Application 20020170806-Engle, et al. discloses conveyor belt spice cover, and methods. Paragraphs, 2, 30 and 31 of Engle read, "[0002] Endless belts are generally made by securing two ends of a length of web material together at a splice to form a continuous loop. The two most common splice types are a lap splice and a butt splice. In a lap splice, the two ends overlap one another, and in a butt splice, the two ends abut, without any overlap. In many applications, the splice is held together by adhesive, tape, or a combination of the two. Additionally or alternatively, in many heavy-duty applications, the splice is held together by a vulcanized bond. Typically for conveyor belts, a belt fastener such as a staple, clip, or other similar fastener is often used to join the two ends in a butt splice. Canadian patent application 2,019,918 uses interlocking members to connect and secure the two ends. Most belt fasteners, such as the staples or clips, are typically metal.

Conveyor belt 10 is made of an elongate web 15 having a first end 12 and a second end 14 that are connected to one another at a splice 20. Splice 20 extends generally transverse across web 15, from a first side edge 15 a to a second side edge 15 b. In most embodiments, splice 20 extends across the shortest distance from first side edge 15 a to second side edge 15 b, but in some embodiments, splice 20 may run at an angle between edges 15 a, 15 b, for example at an angle of about 30 or 45 degrees, in respect to one of edges 15 a, 15 b. Such angled splices are preferred in some applications.

Referring now to FIG. 2 a, a belt fastener 25 secures first end 12 of web 15 to second end 14 of web 15. Generally, multiple belt fasteners 25 are spaced equally along the length of splice 20 from first side edge 15 a to second side edge 15 b. First end 12 may touch second end 14, or a gap may exists between ends 12, 14, as shown in FIG. 2 a; the type of belt fastener 25 used may require a gap or contact between ends 12, 14. Examples of belt fasteners 25 that can be used to secure first end 12 to second end 14 include, for example, nails, screws, bolts, rivets, snaps, clasps, clips, latches, buttons, and zippers. Most belt fasteners commonly embed, at least partially, into web 15; conversely, other belt fasteners, such as bolts and zippers, commonly extend through web 15. Examples of belt fasteners 25 include those commercially available from Flexible Steel Lacing Company, also known as Flexco, of Downers Grove, Ill., and MATO GmbH & Co. of Mühlheim, Germany. In some embodiments, an adhesive tape, nylon tape, or other item may be present to cover any gap between first end 12 and second end 14."

Among other things, US Published Patent Application 20020170806-Engle, et al. does not appear to disclose intermeshed polyester loops attached to the abutment ends of the conveyor belt that are secured by a polymeric pin. Further, Engle does not disclose a merge/diverge conveyor incorporating a slanted nose bar.

5) U.S. Pat. No. 6,164,439-Stebnicki, et al. thermoplastic connecting pin. In part, Column 2 of Stebnicki reads, "The present invention is a thermoplastic connector pin for a modular conveyor belt. The connector pin comprises a core and a shell disposed about the core. A high strength polymer material is used for the core of the connector pin and gives the connector pin improved mechanical properties (i.e., improved tensile strength, shear strength, tensile or flexural modulus of elasticity, and compressive strength). The outside shell is made from a low-friction polymer material for improved wear resistance of the connector pin over standard pins that are currently used in the art. The outside shell is necessary because the high-strength core material can be very abrasive and can cause excess wear to the modular links and the connector pin."

In part, Column 4 of Stebnicki reads, "The core 71 is manufactured from a high-strength polymer. A fiber may be added to the polymer to increase important mechanical properties (i.e., tensile strength, shear strength, tensile or flexural modulus of elasticity and compressive strength). Adding a fiber to the polymer can significantly increase the stiffness of a normally low strength polymer. One preferred fiber which may be added to the thermoplastic core is glass, however, carbon fiber or aramid fiber may also be added.

The outside shell 73 is disposed about the core 71 of the connector pin 17 and is fabricated from a low-friction polymer. The low-friction polymer shell 73 provides a smooth cover for the abrasive fiber filled thermoplastic core. The shell 73 may be an unfilled resin.

The core 71 and the shell 73 are preferably made from materials that can chemically bond together (e.g., the core 71 is a 40% glass filled polypropylene and the shell 73 is an unfilled polypropylene). The materials in the core 71 and the shell 73 should bond together so that the shell 73 does not separate from the core 71.

In another embodiment of the present invention, a lubricant can be introduced into the low-friction polymer that forms the shell 73. Adding a lubricant to the shell 73 decreases the friction of the connector pin 17 even further resulting in decreased wear to the connector pin 17, the first conveyor link 13 and the second conveyor link 15 during operation of the modular conveyor belt."

Among other things, U.S. Pat. No. 6,164,439-Stebnicki, et al. does not disclose intermeshed polyester loops attached to the abutment ends of the conveyor belt that are secured by a polymeric pin. Instead, the '439 patent discloses the combination of a series of modular conveyor belt links held together with a polymeric pin that has a fiber filled thermoplastic core and an unfilled resin shell. The Stebnicki pin is not flexible, but rather a firm high-strength polymer. Further, Stebnicki does not disclose a merge/diverge conveyor incorporating a slanted nose bar.

6) U.S. Pat. No. 5,377,818-White enables a conveyor belt splice cover. In part, Column 3 of White reads, "Referring now to FIG. 2, the conveyor belt is spliced in accord with the invention by using two or more separate pieces of reinforced cover panel. Two cover panels (22) and (23) with excess size (19) and (20), shown in phantom, are cut from a bulk roll of such material. The individual panels are of much smaller size than usual, because they need only be 1 meter, or as required, in width (21). As can be seen from each of the trimmed panels (22) and (23), they are abutted at a bias angle B (of from about 45° to about 75°) at an intermediate point (24) along the splice, yet all reinforcing strands (25) now run continuously across the width of the belt. This method of reinforcing conveyor belt splices results in improved and consistent impact strength over the entire splice area. In addition, since rolls of reinforced splice cover material tend to be limited to about 1 meter in width, manual handling is much more manageable, which also reduces the risk of personal injury."

Among other things, U.S. Pat. No. 5,377,818-White does not appear to disclose intermeshed polyester loops attached to the abutment ends of the conveyor belt that are secured by a polymeric pin having a clip at one end thereof. Further, White does not disclose a merge/diverge conveyor incorporating a slanted nose bar.

SUMMARY OF THE INVENTION

Unlike prior art conveyor belts for merge or diverge conveyors, use of the present conveyor belt allows for quicker installation and removal of the conveyor belt than previously existed. Instead of the two to three hours normally associated with the removal and installation of the conveyor belt, the current conveyor belt article can be removed and installed about a merge or diverge conveyor in as little as one-half hour.

Based on Applicants' research, prior to the present invention, conveyor belts for use with merge or diverge conveyors utilized steel clips to lace the ends of the conveyor belt. Within days after commencement of operation, use of steel clipped conveyor belts results in visible wear and tear to the nose bars of the merge or diverge conveyors. Applicants' invention meets the long felt but unfulfilled need of providing a conveyor belt that uses clusters of polymeric loops or connectors at each abutment end of the belt for attaching the abutment ends of the belt together—resulting in a long lasting belt that does not cause visible damage to the nose bars of merge or diverge conveyors after months of continuous operation.

Within the scope of the present invention, a flexible polymeric pin laces the intermeshed clusters of polymeric loops and prevents the abutment ends of the conveyor belt from pulling apart as the conveyor belt is used for its intended purpose of circulating about the merge or diverge conveyor. Use of Applicants' invention eliminates the prior art's metallic conveyor belt grating on the metallic nose bar of the merge or diverge conveyor which also reduces the nose level associated with traditional operation of prior art merge or diverge conveyors.

An aspect of the present invention is to provide a cost efficient and durable conveyor belt for use with a merge or diverge conveyor.

Still another aspect of the present invention is to provide a conveyor belt capable of being installed about a merge or diverge conveyor more quickly than prior art merge or diverge conveyor belts.

It is another aspect of the present invention to provide a merge or diverge conveyor belt capable of functioning for prolonged periods of time while engaging an edge of the merge or diverge conveyor where the edge of the merge or diverge conveyor is angled from about 20 degrees to 45 degrees.

Yet another aspect of the present invention is to provide a method of providing a new conveyor belt for a new or used merge or diverge conveying apparatus.

It is yet another aspect of the present invention, to provide a conveyor belt that reduces the wear and tear of the angled nose bar of a merge or diverge conveying apparatus.

Still another aspect or the present invention is to provide a conveyor belt having one or more clusters of intermeshed polymeric loops attached to the conveyor belt's abutment ends at for holding the abutment ends of the conveyor together.

It is another aspect of the present invention to provide a flexible polymeric pin for securing the intermeshed polymeric loops.

Yet another aspect of the present invention is to provide a functional merge conveying apparatus or a functional diverge conveying apparatus.

An embodiment of the present invention can be described as a merge or diverge conveying apparatus, comprising: a) a conveyor frame comprising: i) a first lateral side; ii) a second lateral side opposite the first lateral side, wherein the second lateral side is parallel the first lateral side and of lesser length than the first lateral side; iii) a metallic nose bar extending between a first end of the first lateral side and a first end of the second lateral side such that the metallic nose bar is angled from about 20 degrees to about 45 degrees as measured in a horizontal plane from the first lateral side; iv) one or more rolls extending between the first lateral side and the second lateral side; v) an end opposite the nose bar extending generally perpendicular between a second end of the first lateral side and a second end of the second lateral side; and vi) an opening allowing insertion of or removal of one or more parts of the merge or diverge conveying apparatus; b) a conveyor bed supported by said frame; c) a conveyor belt comprising: i) a first abutment end comprising a first series of polyether ether ketone loops attached to the first abutment end, wherein the first series of polyether ether ketone loops is softer than the metallic nose bar; ii) a second abutment end comprising a second series of polyether ether ketone loops attached to the second abutment end for meshing with the first series polyether ether ketone loops, wherein the second series of polyether ether ketone loops is softer than the metallic nose bar; and iii) a nylon 6-6 flexible pin interlocking the first series of polyether ether ketone loops and the second series of polyether ether ketone loops, wherein the nylon 6-6 flexible pin is softer than the metallic nose bar; and d) a drive capable of pulling the conveyor belt about the conveyor bed.

Another embodiment of the present method can be described as a method for providing a new conveyor belt for a merge conveyor or diverge conveyor comprising the steps of: a) supplying an elongate member comprising: i) either nonwoven felt or a urethane core; ii) parallel opposing longitudinal sides; iii) a first abutment end; and iv) a second abutment end; iv) a first band for attaching one or more clusters of polymeric loops to the first abutment end of the elongate member, wherein the first band and first ends of the one or more clusters of polymeric loops are vulcanized to the first abutment end of the elongate member, and wherein the one or more clusters of polymeric loops have a tensile strength of at least 8 Newtons per millimeter of width of the elongate member; and v) a second band for attaching one or more clusters of polymeric loops to a second abutment end of the elongate member, wherein the second band and first ends of the one or more clusters of polymeric loops are vulcanized to the second abutment end of the elongate member, and wherein the one or more clusters of polymeric loops have a ensile strength of at least 8 Newtons per millimeter of width of the elongate member; b) supplying a nylon 6-6 flexible pin for interlocking the one or more clusters of polymeric loops; c) positioning the elongate member and the nylon 6-6 flexible pin in proximity with the merge conveyor or the diverge conveyor, wherein the merge conveyor or the diverge conveyor comprises a drive; the merge conveyor or the diverge conveyor further comprising: i) a first lateral side of a frame; ii) a second lateral side of the frame opposite of the first lateral side, wherein the second lateral side is parallel the first lateral side and of lesser length than the first lateral side; iii) a nose bar extending between a first end of the first lateral side and a first end of the second lateral side such that the nose bar is angled from about 20 degrees to about 45 degrees as measured in a horizontal plane from the first lateral side and wherein the nose bar is harder than the one or more clusters of polymeric loops and the nylon 6-6 flexible pin; iv) one or more rolls extending between the first lateral side and the second lateral side; v) a conveyor bed; and vi) an opening allowing insertion of or removal of one or more parts of the merge conveyor or diverge conveyor; d) if an old conveyor belt is to be removed from the merge conveyor or the diverge conveyor, easing any existing tension applied to the old conveyor belt such that the old conveyor belt is removed from the merge conveyor or the diverge conveyor; e) fitting the elongate member about said conveyor bed; f) meshing the one or more clusters of polymeric loops attached to the first abutment end of said elongate member and the second abutment end of the elongate member; g) lacing the one or more clusters of polymeric loops with the nylon 6-6 flexible pin to create the new conveyor belt; and h) applying adequate tension to the new conveyor belt capable of being pulled about the conveyor bed.

Yet another embodiment of the present method can be described as a method of providing a functional merge conveyor or a functional diverge conveyor, comprising the steps of: a) supplying an elongate carcass comprising: i) a first set of polymeric loops at first end, wherein the first set of polymeric loops has a tensile strength of at least 8 Newtons per millimeter of width of the carcass; and ii) a second set of polymeric loops at a second end opposite the first end, wherein the second set of polymeric loops has a tensile strength of at least 8 Newtons per millimeter of width of the carcass; b) fitting the elongate carcass about a conveyor bed of the merge conveyor or the diverge conveyor; c) meshing the first set of polymeric loops and the second set of polymeric loops; d) using a flexible polyamide pin to interlock the first set of polymeric loops and the second set of polymeric loops to create a conveyor belt; and e) tensioning the conveyor belt for movement about the conveyor bed of the conveyor frame, wherein the conveyor frame further comprises: a nose bar extending between a first lateral side of the conveyor frame and a second lateral side of the conveyor frame such that the nose bar is angled from about 20 degrees to about 45 degrees as measured in a horizontal plane from the first lateral side and wherein the nose bar is harder than the sets of polymeric loops and the flexible polyamide pin.

In still another embodiment, the present invention can be described as a conveyor belt for merge conveyor or a diverge conveyor, wherein the merge or diverge conveyor comprises a nose bar extending between a first lateral side of the conveyor frame and a second lateral side of the conveyor frame such that the nose bar is angled from about 20 degrees to about 45 degrees as measured in a horizontal plane from the first lateral side; and wherein the conveyor belt comprises: a) an elongate carcass comprising: i) a first set of polymeric loops at first end, wherein the first set of polymeric loops has a tensile strength of at least 8 Newtons per millimeter of width of the carcass; and ii) a second set of polymeric loops at a second end opposite the first end, wherein the second set of polymeric loops has a tensile strength of at least 8 Newtons per millimeter of width of the carcass, wherein the first set and the second set of polymeric loops are softer than the nose bar; b) a polymeric flexible pin for lacing the first set of polymeric loops and the second of polymeric loops, wherein the polymeric flexible pin is softer than the nose bar.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 7 is an exemplification of the steps of an embodiment of the current method.

FIG. 8 is a diagrammatic representation of the steps of an embodiment of the present invention.

DESCRIPTION OF THE PREFERRED EMBODIMENTS

The disclosure hereof is detailed to enable those skilled in the art to practice the invention, and the embodiments published herein merely exemplify the present invention and do not limit the scope of the claims appended hereto.

The present invention is primarily directed toward the practice of an angled merge or an angled diverge conveying apparatus and novel and nonobvious conveyor belts associated with the angled merge or an angled diverge conveying apparatus. It is believed that all prior art angled merge or angled diverge conveyors have utilized metallic components, such as steel, to lace the ends of prior art conveyor belts together. Due to the stresses associated with circulation of prior art conveyor belts about the angled merge or angled diverge conveyors, the nose bars of the prior art angled merge or angled diverge conveyors were easily worn down by the circulating prior art conveyor belts. The present invention provides a conveyor belt that can be used with angled merge or angled diverge conveyors for prolonged periods of operation without causing visible damage to the nose bars of the angled merge or angled diverge conveyors. The current invention also provides the additional advantage of reducing nose levels attributed to the operation of prior art merge or diverge conveyors.

Figure 1:
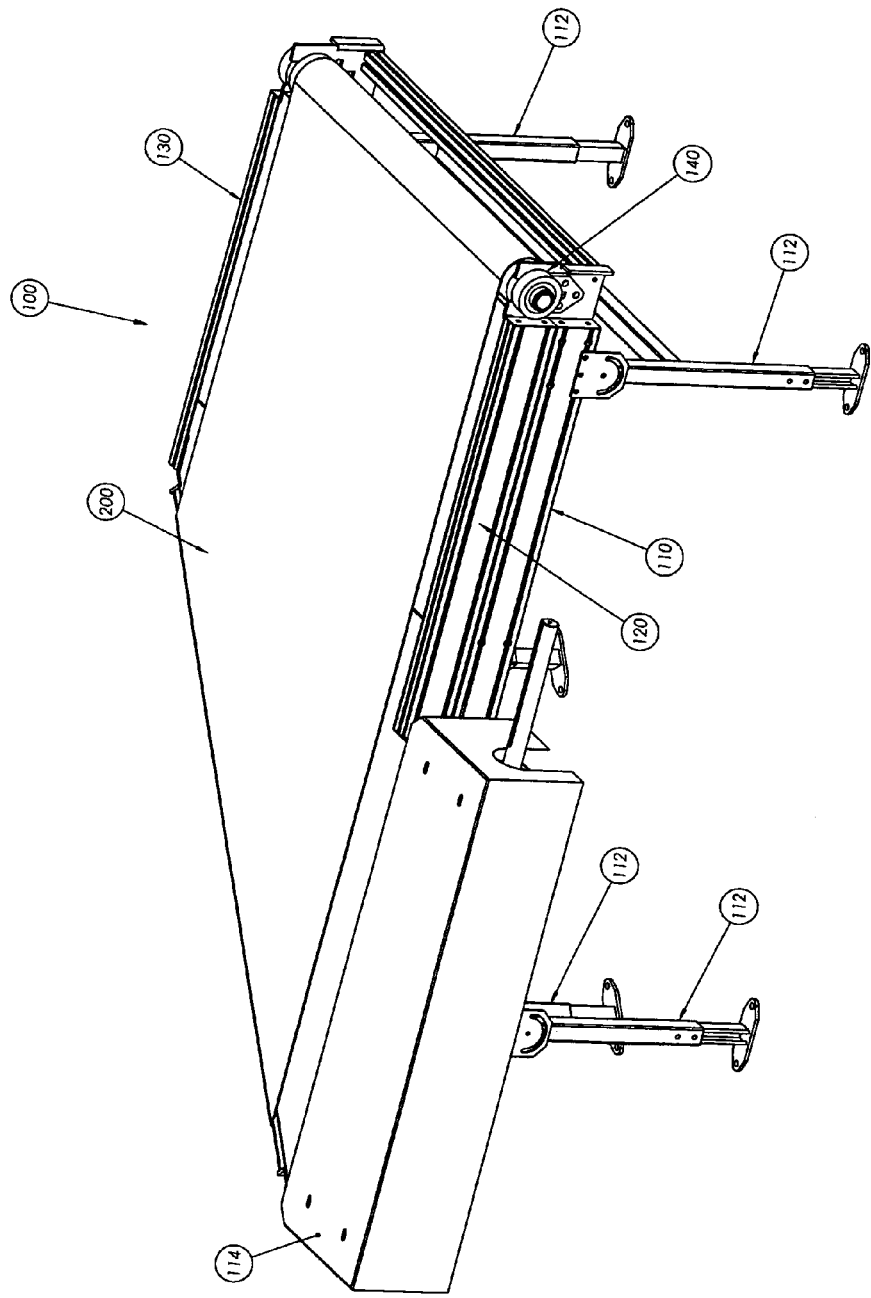
FIG. 1 is a perspective of an embodiment of merge or diverge conveying apparatus.

FIG. 1 is a perspective of an embodiment of merge or diverge conveying apparatus (100). In the FIG. 1 preferred embodiment, frame (110) is manufactured from a metal, such as steel. As shown in the FIG. 1 preferred embodiment, frame (110) has legs (112) that are manufactured from metallic compositions acceptable in the art. Among other things, frame (110) supports drive housing (114) and conveyor belt (200). Frame (110) has first lateral side (120) and second lateral side (130). Second lateral side (130) is of lesser length than first lateral side (120). A follower roll (140) extends between first lateral side (120) and second lateral side (130) of frame (110).

Figure 2:
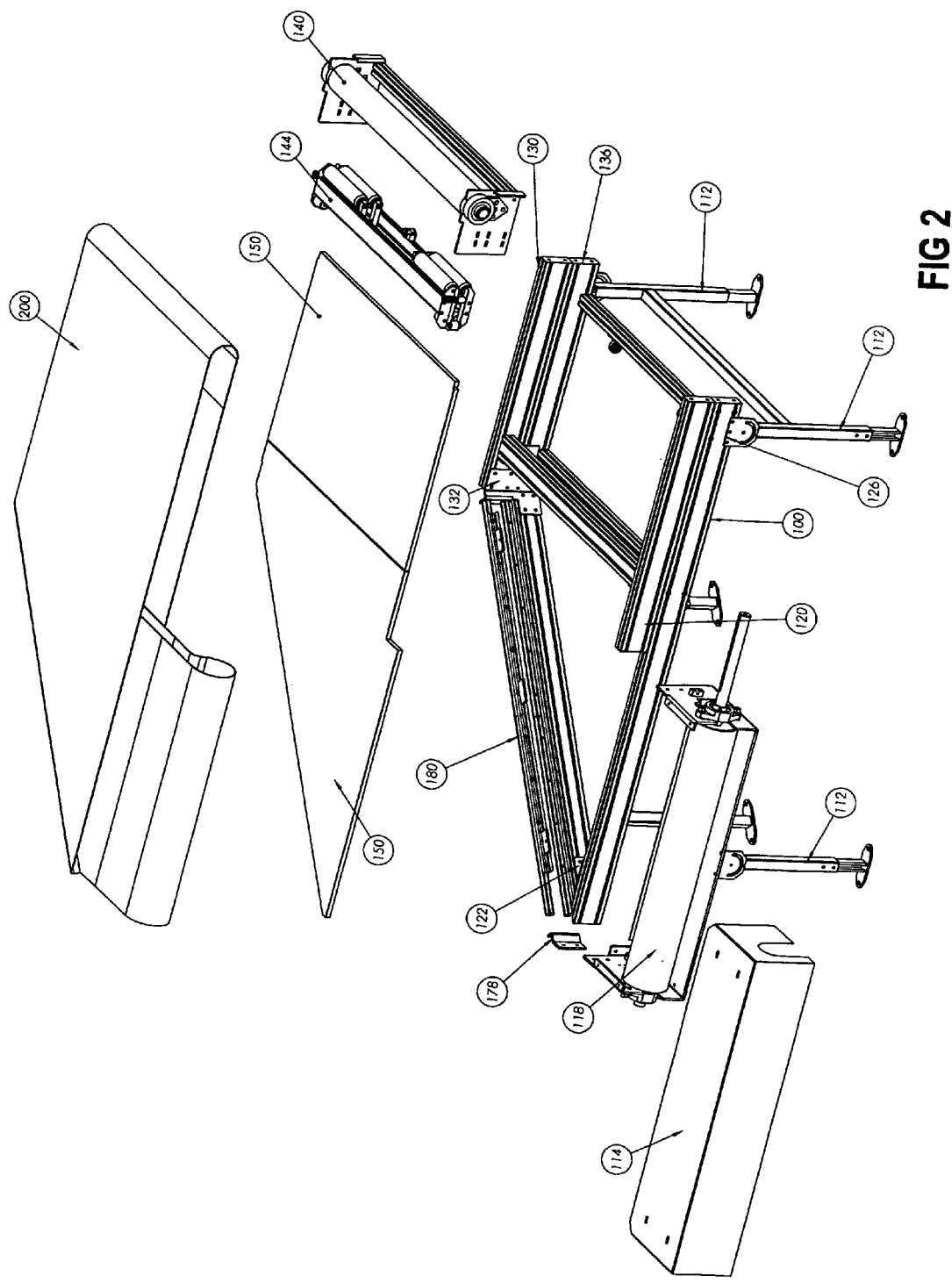
FIG. 2 is an exploded view of the merge or diverge conveying apparatus shown in FIG. 1

FIG. 2 is an exploded view of an embodiment of the merge or diverge conveying apparatus (100) shown in FIG. 1. The removal of housing (114) exposes drive (118) capable of pulling conveyor belt (200) about conveyor bed (150) of merge or diverge conveying apparatus (100). In a preferred embodiment of the current invention, belt tracking station (144) is positioned proximate conveyor bed (150) and follower roll (140). Select preferred embodiments include more than one follower roll (140).

In some preferred embodiments, bracket (178) can assist in securing nose bar or slant (180) to first lateral side (120). Although not shown, a similar bracket can assist in securing slant (180) to second lateral side (130) of frame (110). Nose bar or slant (180) of frame (110) extends between first end (122) of first lateral side (120) and first end (132) of second lateral side (130). In select preferred embodiments of merge or diverge conveying apparatus (100), frame (110) can be provided with an opening that allows insertion or removal of one or more parts of merge or diverge conveying apparatus (100). Follower roll (140) extends between second end (126) of first lateral side (120) and second end (136) of second lateral side (130) of frame (110).

Figure 3:
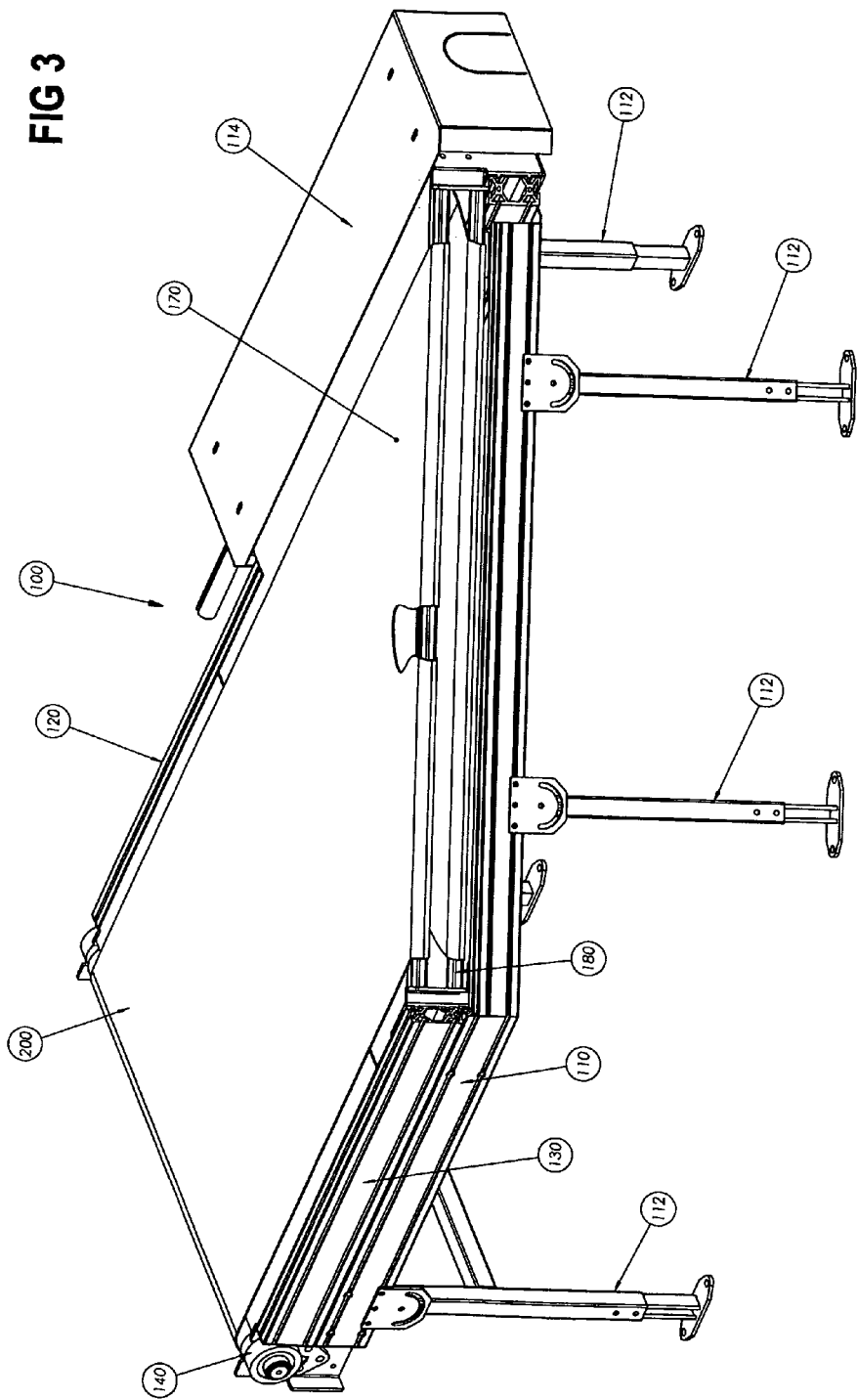
FIG. 3 is another view of merge or diverge conveying apparatus of FIG. 1, where the conveyor belt has been cut away to show the exposed nose bar.

FIG. 3 is another view of merge or diverge conveying apparatus (100) of FIG. 1, where conveyor belt (200) has been cut away to show the exposed nose bar (180). First lateral side (120) of frame (110) is greater in length than second lateral side (130) of frame (110). As measured in a horizontal plane from first lateral side (120), angle (170) is a function of the length of second lateral side (130). Depending on engineering parameters, it has been discovered that preferred embodiments of the current invention include a nose bar or slant (180) that is angled from about 20 degrees to about 45 degrees as measured from first lateral side (120) of frame (110).

Figure 4:
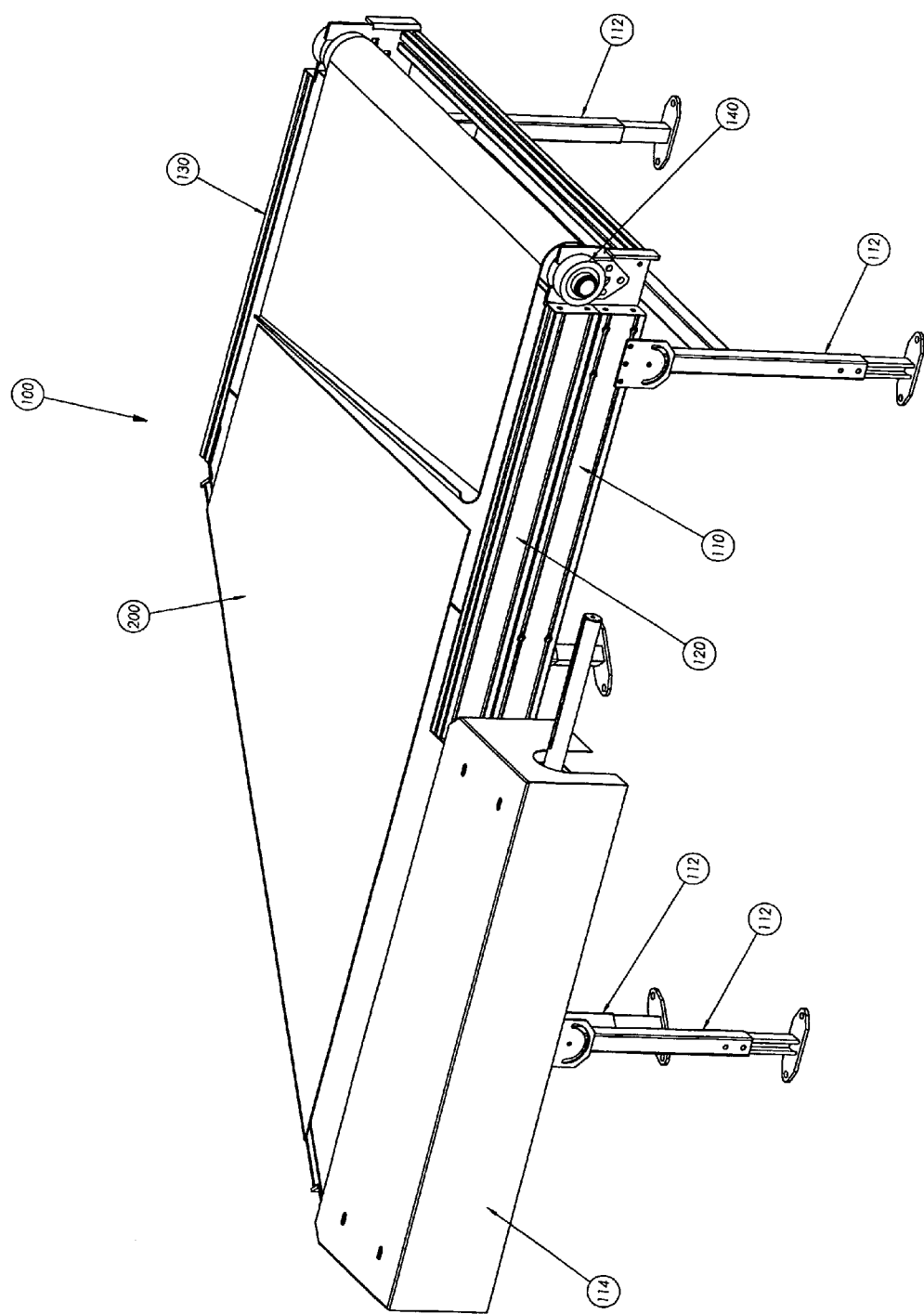
FIG. 4 is a view of the merge or diverge conveying apparatus of FIG. 1 showing first unconnected abutment end and second unconnected abutment end of conveyor belt.
Figure 5:
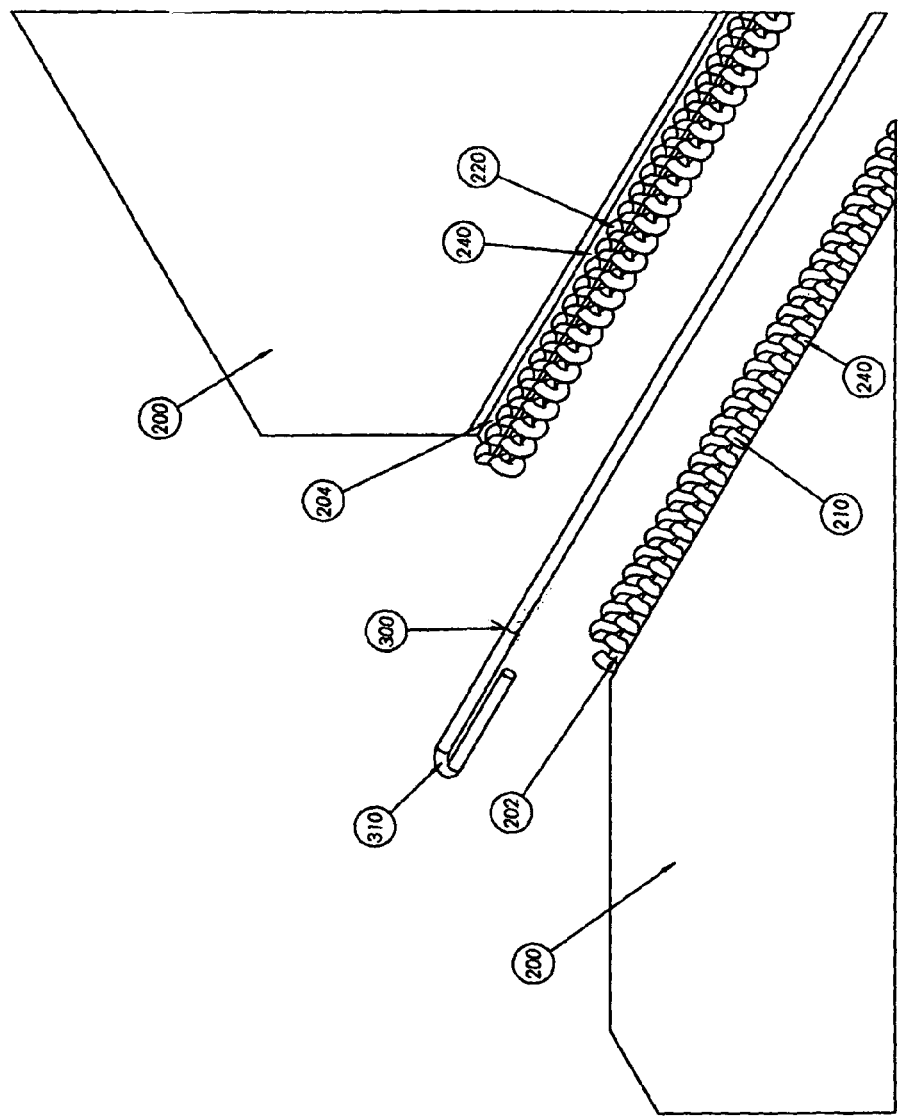
FIG. 5 is a close up of the FIG. 4 first unconnected abutment end and second unconnected abutment end of elongate member and flexible pin.

FIG. 4 is a view of the merge or diverge conveying apparatus (100) of FIG. 1 showing first unconnected abutment end and second unconnected abutment end of conveyor belt (200). FIG. 5 is a close up of the FIG. 4 first unconnected abutment end (202) and second unconnected abutment end (204) of elongate member (200) and flexible pin composition (300).

Select preferred embodiments of elongate member (200) include a carcass that is approximately 2.50 millimeters thick such as a Forbo Siegling NoVo25. The Forbo Sieling NoVo25 belt is manufactured of a nonwoven felt like material having an internal fabric ply with superior and inferior surfaces, where the exposed ends are packed tightly together. Another preferred embodiment of elongate member (200) includes a carcass with a urethane core between the outer plies, where at least one of the outer plies is a urethane enhanced friction surface, such as a Forbo Seigling E12/2 U0/U/U2 belt. Elongate members (200) within the scope of the present invention are capable of reducing wear and tear of nose bar (180) of frame (110) while simultaneously equaling or enhancing belt life of currently available belts utilized with merge or diverge conveying apparatus.

Preferred embodiments of the present invention have clusters, series or sets (210) of polymeric loops attached to first abutment end (202) of elongate member (200) and clusters, series or sets (220) of polymeric loops attached to second abutment end (204) of elongate member (200). In select preferred embodiments, the clusters (210) of polymeric loops and the clusters (220) of polymeric loops can be interlocked in a zipper-like manner.

Through experimentation, it has been discovered that polymeric loops or connectors (210, 220) with a tensile strength of at least 8 Newtons per millimeter of width of elongate member (200) have adequate tensile strength to withstand the stresses of running over nose bar or slant (180) of merge or diverge conveying apparatus (100) for prolonged periods of time without breaking. By way of illustration, the polymeric loops or connectors (210, 220) of the current invention are capable being run at speeds of about 85 meters per minute without interruption for more than six months while in use with diverge or merge conveyors within the scope of the present invention. In select preferred embodiments, connector bands (240) secure connectors (210, 220) to abutment ends (202, 204) of elongate member (200). In some select preferred embodiments, first ends of connector bands (240) are vulcanized to abutment ends (202, 204).

Through experimentation, it has been discovered that polyether ether ketone (PEEK) is a preferred composition for polymeric loops (210, 220). The combination of polyether ether ketone loops (210, 220) with preferred conveyor belts within the scope of the current invention provide adequate functional tensile strength to hold abutment ends (202, 204) of conveyor together for prolonged periods of time while simultaneously reducing the wear and tear of nose bar (180) attributable to prior art laces or interlocking devices.

It has also been discovered that combination of conveyor belts and the polymeric loops or connectors (210, 220), within the scope of the present invention, reduce the wear and tear of nose bar (180) attributable to the prior art's metallic clips, staples and/or hooks previously used to connect opposite ends of the belt of a merge or diverge conveyor. By way of illustration, test operations of various prototypes of conveyor belts (200), within the ambit of the current invention, at secret and secure locations, revealed no visible wear to nose bar (180) after at least three months of operation because polymeric connectors (210, 220) were softer than nose bar (180). Testing parameters included prototypes of conveyor belts circulating about the nose bar (180) of merge or diverge conveying apparatus (100) at the speed of fifty-two revolutions per minute while subjecting the conveyor belt a test weight of about 18 kilograms per cycle. Under the same testing parameters, when a currently available commercial conveyor belts utilizing metallic high-tensile steel clips to secure the belt's ends together were utilized, there was measurable wear to nose bar (180) within ten days after testing commenced. In other tests, the combination of a softer stainless steel clip (430 stainless steel) to connect the ends of the conveyor belt was subjected to the same testing parameters and failure of the 430 stainless steel clips occurred within five to seven days after the inauguration of testing.

Figure 6:
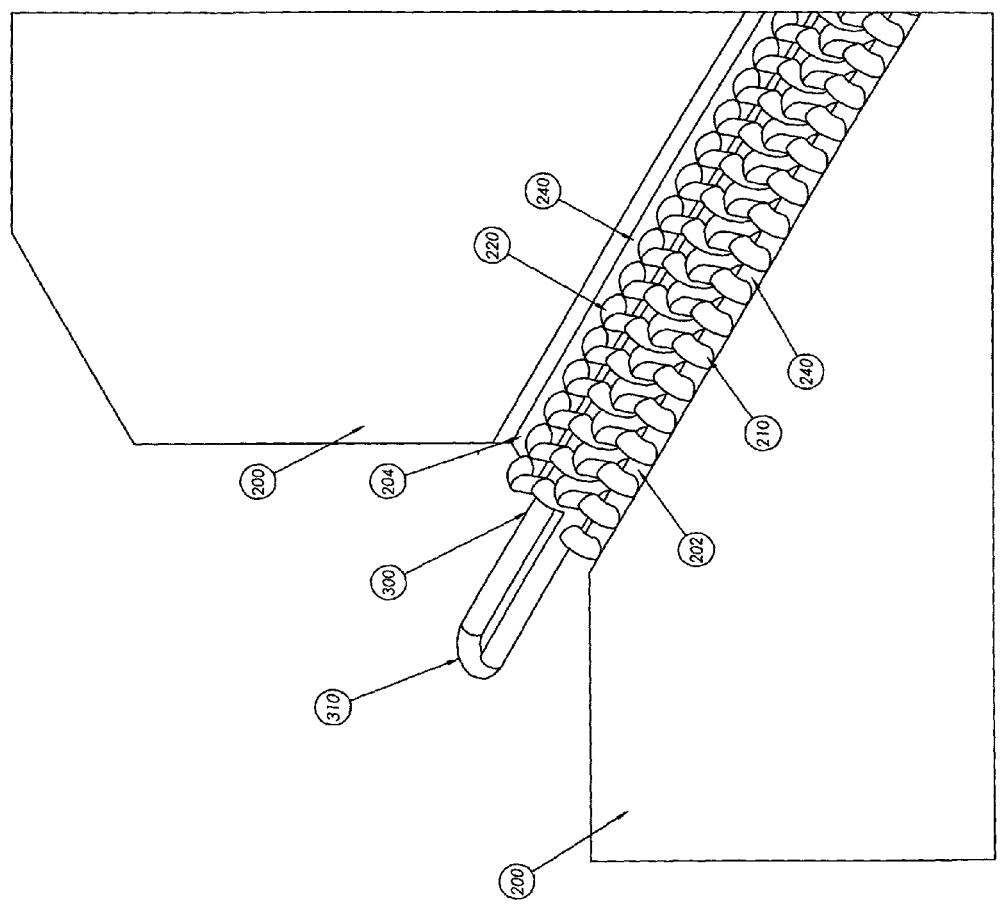
FIG. 6 is a close up of first abutment end, second abutment end of elongate member and flexible pin that have been interconnected to create a conveyor belt within the scope of the present invention.
Figure 9:
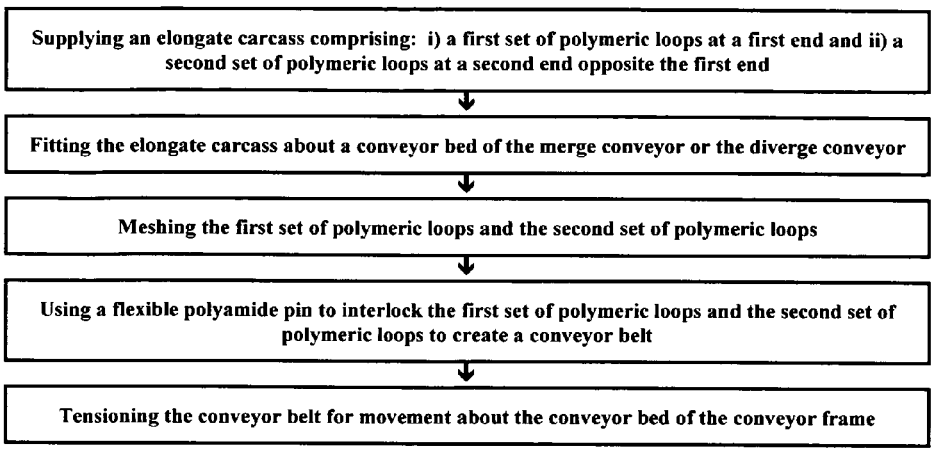
FIG. 9 is another diagrammatic representation of the steps of an embodiment of the present invention.
Figure 10:
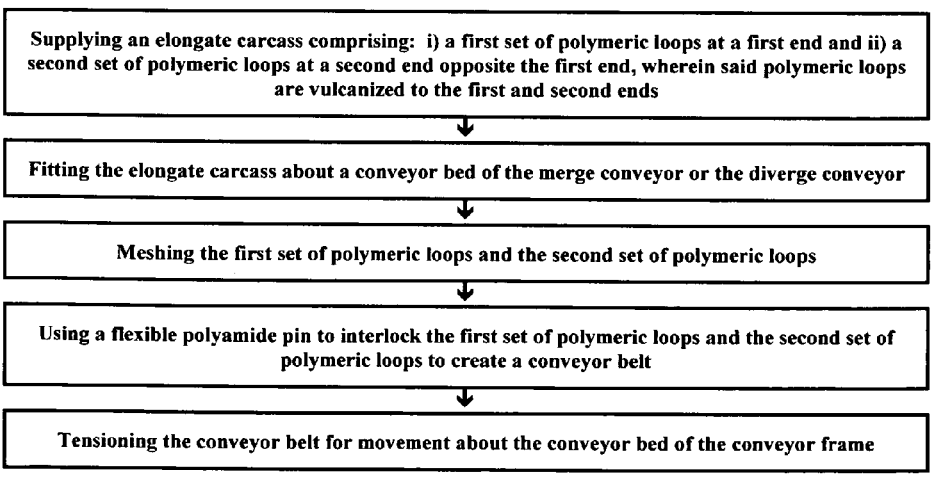
FIG. 10 is yet another exemplification of the steps of an embodiment of the present invention.

FIGS. 5 and 6 also enable flexible pin (300). For the successful practice of the current invention, preferred embodiments of pin (300) must be sufficiently flexible to maneuver about the conveyor without disrupting operation of the conveyor while adequately firm to prevent misalignment of polymeric connectors (210, 220) as conveyor belt circulates about merge or diverge conveyor (100). Through experimentation, it has been discovered that polyamides that are softer than nose bar (180) are preferred compositions for flexible pin (300). Polyamide flexible pins with relatively small diameters have been shown to provide adequate strength and flexibility to lace polymeric connectors (210, 220) together while not visibly damaging nose bar (180) during operation of a prototype conveyor belt (200) about merge or diverge conveying apparatus (100) at the speed of fifty-two revolutions per minute as the conveyor belt (200) was subjected to a test weight of about 18 kilograms per cycle. A preferred diameter for polyamide pin (300) is about 1.0 millimeter while a preferred composition for polyamide pin (300) is nylon 6-6. Specifically, within the scope of the current invention, a Shakespeare NX-500 pin with a diameter of about 1.0 millimeter has been found to function successfully for its intended purpose.

FIG. 6 is a close up of abutment end (202) and second abutment end (204) of elongate member (200) that have been connected by flexible pin (300). As shown in FIGS. 5 and 6, a preferred embodiment of flexible pin (300) includes curve or hook (310) at one end. Other preferred embodiments of flexible pin (300) do not utilize a curve (310).

Insertion of flexible pin (300) through polymeric loops (210, 220) prevents meshed or interlocked polymeric loops (210, 220) from pulling apart as conveyor belt (200) circulates about merge or diverge conveying apparatus (100). The combination of flexible pin (300) and secured or interlocked polymeric loops (210) attached to first abutment end (202) of elongate member (200) and polymeric loops (220) attached to second abutment end (204) of elongate member (200) create conveyor belt (200). Hook or curve (310) of flexible pin further secures flexible pin (300) to polymeric loops (210, 220) to prevent the forces attributable to circulating about nose bar (180) and conveyor bed (150) from causing flexible pin (300) to work away its way out of polymeric loops (210, 220). In other embodiments, a heat sink can be used for securing flexible pin (300) with polymeric loops (210, 220).

In the practice of the present invention, if an old conveyor belt is to be removed from the merge or diverge conveyor, the tension on the old conveyor belt is eased and the old belt is removed from the merge or diverge conveyor. After the old conveyor belt is removed, the elongate member of the current invention can be fitted about the conveyor bed. A preferred embodiment of the current flexible pin is utilized to lace a preferred embodiment of meshed polymeric loops attached to the abutment ends of a preferred embodiment of the elongate member to create a new conveyor belt within the scope of the present invention. After new conveyor belt (200) is fitted about the merge or diverge conveyor, a combination of drive (118), belt tracking station (144) and one or more follower rolls (140) is then utilized to create adequate tension on conveyor belt (200) to make the conveyor belt functional for its intended purpose.

Steps associated with the practice of select embodiments of the current invention and methods are disclosed in FIGS. 7-10.

Having disclosed the invention as required by Title 35 of the United States Code, Applicants now pray respectfully that Letters Patent be granted for their invention in accordance with the scope of the claims appended hereto.

What is claimed is:

1. A method for providing a new conveyor belt for a merge conveyor or diverge conveyor comprising the steps of:
   a) supplying an elongate member comprising:
      i) either nonwoven felt or a urethane core;
      ii) parallel opposing longitudinal sides;
      iii) a first abutment end; and
      iv) a second abutment end;
      iv) a first band for attaching one or more clusters of polymeric loops to said first abutment end of said elongate member, wherein said first band and first ends of said one or more clusters of polymeric loops are vulcanized to said first abutment end of said elongate member, and wherein said one or more clusters of polymeric loops have a tensile strength of at least 8 Newtons per millimeter of width of said elongate member; and
      v) a second band for attaching one or more clusters of polymeric loops to a second abutment end of said elongate member, wherein said second band and first ends of said one or more clusters of polymeric loops are vulcanized to said second abutment end of said elongate member, and wherein said one or more clusters of polymeric loops have a tensile strength of at least 8 Newtons per millimeter of width of said elongate member;

b) supplying a nylon 6-6 flexible pin for interlocking said one or more clusters of polymeric loops;
c) positioning said elongate member and said nylon 6-6 flexible pin in proximity with said merge conveyor or said diverge conveyor, wherein said merge conveyor or said diverge conveyor comprises a drive; said merge conveyor or said diverge conveyor further comprising:
 i) a first lateral side of a frame;
 ii) a second lateral side of said frame opposite of said first lateral side, wherein said second lateral side is parallel said first lateral side and of lesser length than said first lateral side;
 iii) a nose bar extending between a first end of said first lateral side and a first end of said second lateral side such that said nose bar is angled from about 20 degrees to about 45 degrees as measured in a horizontal plane from said first lateral side and wherein said nose bar is harder than said one or more clusters of polymeric loops and said nylon 6-6 flexible pin;
 iv) one or more rolls extending between said first lateral side and said second lateral side;
 v) a conveyor bed; and
 vi) an opening allowing insertion of or removal of one or more parts of said merge conveyor or diverge conveyor;
d) if an old conveyor belt is to be removed from said merge conveyor or said diverge conveyor, easing any existing tension applied to said old conveyor belt such that said old conveyor belt is removed from said merge conveyor or said diverge conveyor;
e) fitting said elongate member about said conveyor bed;
f) meshing said one or more clusters of polymeric loops attached to said first abutment end of said elongate member and said second abutment end of said elongate member;
g) lacing said one or more clusters of polymeric loops with said nylon 6-6 flexible pin to create said new conveyor belt;
h) applying adequate tension to said new conveyor belt such that said new conveyor belt can be pulled about said conveyor bed; and
i) circulating said new conveyor belt about said nose bar for a consecutive period of at least ninety days wherein said new conveyor belt does not cause visible wear and tear to said nose bar, and wherein said nylon 6-6 flexible pin comprises sufficient flexibility to allow continuous circulation of said new conveyor belt over said nose bar without breaking said new conveyor belt while said nylon 6-6 flexible pin is adequately firm to prevent misalignment of said polymeric loops.

2. The method of claim 1, wherein said polymeric loops are polyether ether ketone loops.

3. The method of claim 2 further step of bending said nylon 6-6 flexible pin to include a curve at one end thereof.

4. The method of claim 3, wherein said step of circulating said new conveyor belt about said nose bar for a consecutive period of at least ninety days further comprises the step of moving weights of about 18 kilograms per revolution at the speed of fifty-two revolutions per minute.

5. A method for providing a new conveyor belt for a merge conveyor or diverge conveyor comprising the steps of:
a) supplying an elongate member comprising:
 i) either nonwoven felt or a urethane core;
 ii) parallel opposing longitudinal sides;
 iii) a first abutment end; and
 iv) a second abutment end;
 iv) a first band for attaching one or more clusters of polymeric loops to said first abutment end of said elongate member, wherein said one or more clusters of polymeric loops have a tensile strength of at least 8 Newtons per millimeter of width of said elongate member; and
 v) a second band for attaching one or more clusters of polymeric loops to a second abutment end of said elongate member, wherein said one or more clusters of polymeric loops have a tensile strength of at least 8 Newtons per millimeter of width of said elongate member;
b) supplying a polyamide flexible pin for interlocking said one or more clusters of polymeric loops;
c) positioning said elongate member and said polyamide flexible pin in proximity with said merge conveyor or said diverge conveyor, wherein said merge conveyor or said diverge conveyor comprises a drive; said merge conveyor or said diverge conveyor further comprising:
 i) a first lateral side of a frame;
 ii) a second lateral side of said frame opposite of said first lateral side, wherein said second lateral side is parallel said first lateral side and of lesser length than said first lateral side;
 iii) a nose bar extending between a first end of said first lateral side and a first end of said second lateral side such that said nose bar is angled from about 20 degrees to about 45 degrees as measured in a horizontal plane from said first lateral side and wherein said nose bar is harder than said one or more clusters of polymeric loops and said polyamide pin;
 iv) one or more rolls extending between said first lateral side and said second lateral side;
 v) a conveyor bed; and
 vi) an opening allowing insertion of or removal of one or more parts of said merge conveyor or diverge conveyor;
d) if an old conveyor belt is to be removed from said merge conveyor or said diverge conveyor, easing any existing tension applied to said old conveyor belt such that said old conveyor belt is removed from said merge conveyor or said diverge conveyor;
e) fitting said elongate member about said conveyor bed;
f) meshing said one or more clusters of polymeric loops attached to said first abutment end of said elongate member and said second abutment end of said elongate member;
g) lacing said one or more clusters of polymeric loops with said polyamide flexible pin to create said new conveyor belt;
h) applying adequate tension to new conveyor belt such that said new conveyor belt can be pulled about said conveyor bed; and
i) circulating said new conveyor belt about said nose bar for a consecutive period of at least ninety days wherein said new conveyor belt does not cause visible wear and tear to said nose bar, and wherein said polyamide flexible pin comprises sufficient flexibility to allow continuous circulation of said new conveyor belt over said nose bar without breaking said new conveyor belt, while simultaneously, said polyamide flexible pin is adequately firm to prevent misalignment of said polymeric loops.

6. The method of claim 5, wherein said polymeric loops are polyether ether ketone loops.

7. The method of claim 6 further step of bending said polyamide flexible pin to include a curve at one end thereof.

8. The method of claim 7 further comprising the step of vulcanizing said meshed polyether ether ketone polymeric loops and said flexible polyamide pin.

9. The method of claim 8, wherein said flexible polyamide pin is nylon 6-6.

10. The method of claim 9, wherein said step of circulating said new conveyor belt about said nose bar for a consecutive period of at least ninety days further comprises the step of moving weights of about 18 kilograms per revolution at the speed of fifty-two revolutions per minute.

* * * * *